(12) United States Patent
Kwan et al.

(10) Patent No.: US 10,405,264 B2
(45) Date of Patent: Sep. 3, 2019

(54) BULK PAIRING FOR MESH NETWORKS

(71) Applicant: WiSilica Inc., Laguna Hills, CA (US)

(72) Inventors: Dennis Kwan, San Diego, CA (US);
Suresh Kumar Singamsetty, Aliso Veijo, CA (US)

(73) Assignee: WiSilica Inc., Laguna Hills, CA (US)

( * ) Notice: Subject to any disclaimer, the term of this patent is extended or adjusted under 35 U.S.C. 154(b) by 10 days.

(21) Appl. No.: 15/785,612

(22) Filed: Oct. 17, 2017

(65) Prior Publication Data

US 2018/0109993 A1  Apr. 19, 2018

Related U.S. Application Data

(60) Provisional application No. 62/408,850, filed on Oct. 17, 2016.

(51) Int. Cl.
| | |
|---|---|
| *H04W 4/80* | (2018.01) |
| *H04L 29/06* | (2006.01) |
| *H04W 48/10* | (2009.01) |
| *H04W 76/14* | (2018.01) |
| *H04W 48/14* | (2009.01) |
| *H04L 12/721* | (2013.01) |
| *H04W 12/00* | (2009.01) |
| *H04W 84/18* | (2009.01) |

(52) U.S. Cl.
CPC ............. *H04W 48/10* (2013.01); *H04L 45/32* (2013.01); *H04L 63/0428* (2013.01); *H04W 4/80* (2018.02); *H04W 12/003* (2019.01); *H04W 48/14* (2013.01); *H04W 76/14* (2018.02); *H04L 69/22* (2013.01); *H04W 84/18* (2013.01)

(58) Field of Classification Search
CPC ..... H04W 48/10; H04W 48/14; H04W 12/04; H04W 4/80; H04W 76/14; H04W 84/18; H04L 45/32; H04L 63/0428; H04L 69/22
See application file for complete search history.

(56) References Cited

U.S. PATENT DOCUMENTS

| | | | | |
|---|---|---|---|---|
| 7,948,966 | B2* | 5/2011 | Hughes | H04L 45/122 370/351 |
| 2009/0138617 | A1* | 5/2009 | Veillette | G01D 4/004 709/238 |
| 2014/0048522 | A1* | 2/2014 | Dina | B23K 9/0953 219/132 |

FOREIGN PATENT DOCUMENTS

EP         2661112 A1 * 11/2013    ........... H04L 63/065

* cited by examiner

*Primary Examiner* — Curtis A Alia
(74) *Attorney, Agent, or Firm* — Rowan TELS LLC

(57) ABSTRACT

A pairing scheme may add devices to a mesh network automatically. Assuming that at least one device is already part of the mesh network, this scheme may allow devices that have not been paired yet to be automatically added to the mesh, eliminating manual pairing processes. When a new device is powered on, it may broadcast a connectable advertisement packet. The payload of this packet may be secure and not understood by the recipient device. Rather, only a server may have a copy of the device key, and can thus decrypt the advertising packet. The server sends a packet back with a network key and information, and the device then becomes part of the network.

16 Claims, 4 Drawing Sheets

BULK PAIRING FOR MESH NETWORKS

CROSS-REFERENCE TO RELATED APPLICATION

This application claims the benefit of U.S. Provisional Patent Application No. 62/408,850 filed Oct. 17, 2016. The subject matter of this earlier filed application is hereby incorporated by reference in its entirety.

FIELD

The present invention generally relates to mesh networks, and more particularly, to bulk pairing for mesh networks.

BACKGROUND

With Bluetooth™ low energy (BLE) technology, it is possible to embed low cost, low power control modules in sensors, lighting, appliances, and other devices. An increase in the number of nodes also increases the requirement for secure methods of commissioning these devices. Adding devices manually consumes significant effort and adding devices in batches requires monitoring of all of the devices in the batch, which is also complex. Accordingly, an improved approach to adding devices may be beneficial.

SUMMARY

Certain embodiments of the present invention may provide solutions to the problems and needs in the art that have not yet been fully identified, appreciated, or solved by conventional mesh networking technologies. For example, some embodiments pertain to a pairing scheme that adds devices to a mesh network automatically.

In an embodiment, a mesh network system includes a new device that has not yet joined the mesh network, an originating node associated with the mesh network, a leader node of the originating node associated with the mesh network, a bridge associated with the mesh network, and a server. The new device is configured to broadcast an advertising packet including a header. The originating node is configured to receive the advertising packet from the new device, process the header, determine from the header that the advertising packet is intended for the server, include an identifier of the leader node of the originating node in the header, increment the hop count in the header, and broadcast the advertising packet for receipt by the leader node of the originating node. The leader node of the originating node is configured to receive the advertising packet from the originating node, increment the hop count in the header, and broadcast the advertising packet. The bridge is configured to receive the advertising packet from the leader node of the originating node and transmit the advertising packet to the server.

In another embodiment, a mesh network system includes a new device, an originating node, an endpoint node, and a server. The new device is configured to transmit an advertising packet including an encrypted payload that is received by the originating node and rebroadcast by one or more devices in the mesh network system until it is received by the endpoint node or a maximum hop count is reached. The endpoint node is configured to transmit the advertising packet to the server. The server is configured to decrypt information in the encrypted payload of the advertising packet, identify the new device based on the decrypted information, determine whether the new device is allowed to be configured, and when the new device is allowed to be configured, send encrypted configuration packets to the endpoint node. The encrypted configuration packets include network information that can only be decrypted by the new device.

In yet another embodiment, a method for performing bulk pairing in a mesh network includes broadcasting an advertising packet including a header and an encrypted payload, by a new device that is not paired with the mesh network. The header includes information that informs the originating node to send the advertising packet along to the server. The method also includes receiving the advertising packet, processing the header to determine that the advertising packet is intended for the server, and transmitting the advertising packet to the server, by a bridge that is configured to communicate with the server. The method further includes decrypting the payload, validating an identity of the new device using the decrypted payload, and when the new device is allowed to be configured, transmitting configuration packets to the bridge, by the server.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1A:
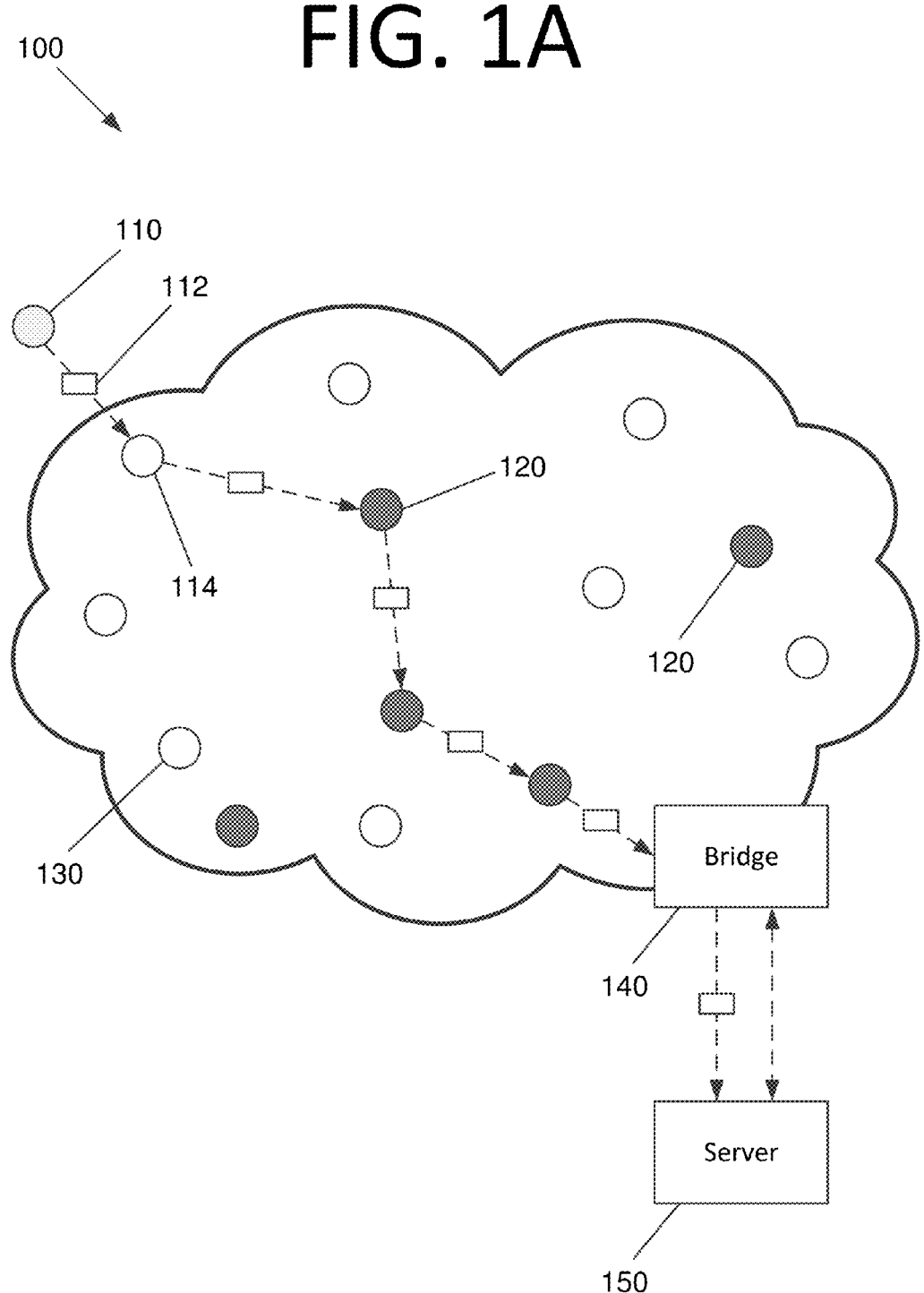
FIG. 1A is an architectural diagram illustrating a mesh network with a new device sending an advertising packet, according to an embodiment of the present invention.

Some embodiments of the present invention pertain to a pairing scheme that adds devices to a mesh network automatically. "Pairing" is defined herein as the exchange of security and network information. Once the pairing feature exchange is complete, a temporary security key is exchanged and the connection is encrypted, but only using the temporary key. In this encrypted connection, long term keys are exchanged. These keys include information such as the (long term) encryption key to encrypt a connection, a digital signature key, etc. The exact keys that are exchanged may be determined by the security features of each device, and various pairing and encryption schemes may be used without deviating from the scope of the invention.

Assuming that at least one device is already part of the mesh network, this scheme may allow devices that have not been paired yet to be automatically added to the mesh, eliminating manual pairing processes. When a new device is powered on, it may broadcast a connectable advertisement (or commissioning) packet, which is also called an "advertising packet" herein. The payload of this packet may be encrypted and not understood by a recipient device (for instance, an originating node) in some embodiments—e.g., only a server may have a copy of the device key, and can thus decrypt the advertising packet.

The server sends at least one packet back with a network key and information, and the device then becomes part of the network. If any device in the mesh receives this packet in some embodiments (i.e., an "originating node"), the recipient device broadcasts the packet for receipt by its leader node, and the packet is propagated via leader node rebroadcasting to a bridge (i.e., an "endpoint node"). The bridge device in some embodiments communicates with the server, which provides device-specific pairing encrypted information. The bridge, in turn, then transmits this data as configuration packets to the mesh.

In some embodiments, the initial advertisement that asks for pairing is a single packet in order to minimize overhead. The server may send multiple packets (e.g., configuration packets) with pairing information responsive to receipt of the advertising packet, and these configuration packets are passed though the mesh network to the originating node that received the initial advertisement packet from the new device. This originating node may then connect to the new device and write this security information.

When the originating device that received the initial advertisement from the new device receives this packet, in some embodiments, it connects to and writes the configuration packets to the new device, and makes the new device part of the mesh network. In this process, the new device may assign the originating device that writes the configuration to it as its leader node. As new devices are added, the mesh network may reconfigure itself with appropriate leader nodes, resulting in a highly scalable mesh. In this process, devices that are nearer to the bridge may be paired first, and the process may continue until all appropriate devices have been paired.

It should be noted that initially, there are no nodes in the network other than the bridge. As the first node is turned on and broadcasts its advertising packet, this packet would be received by the bridge, and the bridge would serve the role of the originating node. As more and more nodes are paired, the mesh network grows, and nodes that are further and further from the bridge in terms of numbers of hops and interim leader nodes connect to the network until all devices are connected or a hop count of a new device that is trying to connect to the network is too large.

In some embodiments, the nodes in the mesh network do not have routing tables and do not know about other nodes in the mesh network. A leader election process may be initiated whenever any node in the mesh network does not receive a "heartbeat" message from a leader node for a predetermined period of time. The specific details of the leader node election process are not discussed herein. Once this leader node election process is complete, a leader node forwards any message it receives if it is not meant for the leader node itself and a hop count is not met. For instance, if the hop count limit is seven and the message has a hop count less than this number, the leader node will increment the hop count and rebroadcast the message, or the next leader node will increment the hop count upon receipt. An endpoint node may forward messages in some embodiments only if the message is not for the endpoint node itself, and the hop count is then set to zero.

Advantages of some embodiments include, but are not limited to, easier installation, secure installation, reliable installation, finding optimal retransmission modes, and a generic scheme. Easier installation may be provided since it is easier to install devices, commission them, and add them as part of the mesh network. Installation may be plug-and-play as power on of the device may trigger the pairing operations, resulting in minimal manual effort.

Secure installation may be provided since all communication may be encrypted and only the new device and server may decrypt communications in some embodiments, eliminating key leaks. Reliable installation may be provided since some embodiments eliminate the problem of accidentally missing a few devices. As long as devices are in the range of each other, all devices will be paired. Optimal retransmission nodes may also be found. Since addition of nodes happens based on proximity in some embodiments, the scheme may contribute to leader node election by finding optimal leader nodes. The scheme of some embodiments may also be used as a generic scheme across multiple types of devices.

Conventionally, when devices are powered on, they only have factory defaults. When devices are paired individually, it is the responsibility of the customer to add the allocated keys and add the new devices to the network. However, doing this for every device may be a cumbersome process, insecure, and error prone. If there is large number of devices, the probability of errors increases. Bulk pairing schemes typically include human/machine readable codes that will be scanned and used to fetch information about the batch of devices and add them to the network one by one. However, this requires human action along with the actual installation and creates the same issues discussed above.

FIG. 1A is an architectural diagram illustrating a mesh network 100 with a new device 110 sending an advertising packet 112, according to an embodiment of the present invention. All that a user has to do in some embodiments is power new device 110 on. New device 110 advertises connectable advertisement packet 112 that requests for pairing of new device 110 and to be added to mesh network 100. This information may be included in a packet header, and the payload may be encrypted. Devices of mesh network 100 are referred to herein as "nodes." Nodes 120 are leader nodes and nodes 130 are non-leader nodes. While only one path is depicted here, there may be multiple valid paths through mesh network 100 without deviating from the scope of the invention.

The information in the payload of advertising packet 112 is only understood by a server 150 in some embodiments and all intermediate nodes in the path may simply relay the advertisement packet data, including a bridge (or endpoint node) 140. The user may control the devices that can be paired in some embodiments using this scheme by adding information pertaining to the devices to server 150 using a mobile and/or web application (not shown). The mobile and/or web application may include methods to provide this information to server 150 for one device at a time or in bulk.

In FIG. 1A, an originating node 114 receives advertising packet 112 from new device 110. While originating node 114 is shown here as a non-leader node, in some embodiments, the originating node may be a leader node. Any node that receives an advertising packet with a hop count of 0 will rebroadcast the advertising packet in some embodiments, and either increment the hop count or allow a receiving leader node to do so.

Advertising packet 112 includes information informing originating node 114 that advertising packet 112 should be relayed to server 150, or at least rebroadcast. Originating node 114 does not know the path to bridge 140 or to any other node in some embodiments. Thus, originating node 114 rebroadcasts the advertising packet for receipt by its leader node. This leader node then increases the hop count and rebroadcasts advertising packet 112, which is received by bridge 140, or rebroadcast by another leader node, until advertising packet 112 is received by bridge 114 or the hop count limit is reached.

Bridge 140 is configured to communicate with server 150. Bridge 140 sends advertising packet 112 to server 150, and also basic bridge authentication, message validation, proper error and status responses from server 150 to bridge 140 for the request from bridge 140 and configuration packets for new device 110. Per the above, server 150 has keys and network information for new device 110.

Figure 1B:
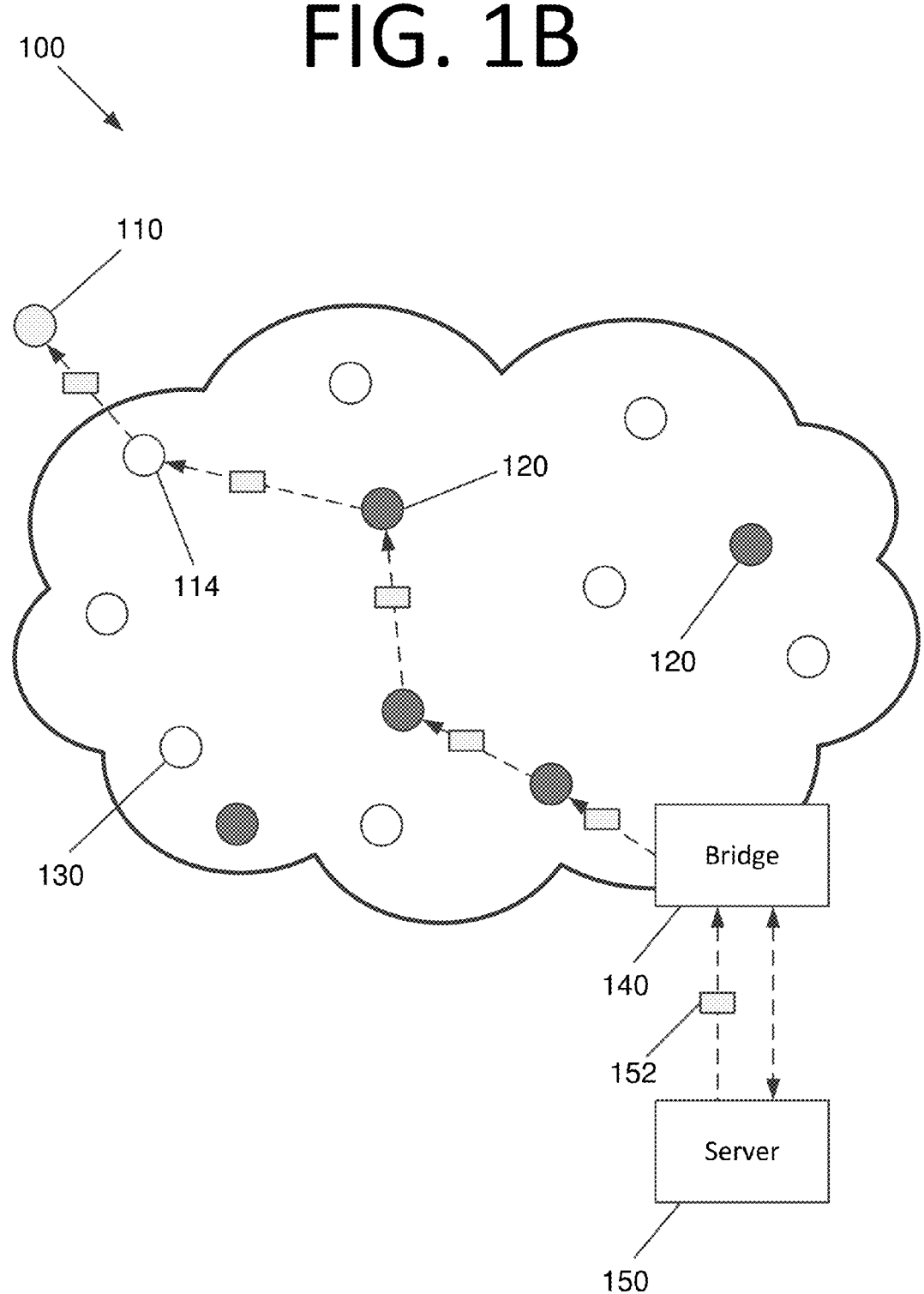
FIG. 1B is an architectural diagram illustrating the mesh network with the new device receiving configuration packets, according to an embodiment of the present invention.

FIG. 1B is an architectural diagram illustrating mesh network 100 with new device 110 receiving configuration packets 152, according to an embodiment of the present invention. When server 150 receives advertising packet 112, it validates the identity of new device 110. Server 150 then sends appropriate network information to new device 110, which can only be decoded by new device 110, when new device 110 is allowed to be configured via encrypted configuration packets 152 that can only be decrypted by the new device in some embodiments. When bridge 140 receives configuration packets 152 from server 150, it passes this information back through mesh network 100, which will reach originating node 114 that received the initial communication from new device 110. While the same path is shown in FIGS. 1A and 1B, in some embodiments, configuration packets 152 may take a different path back to reach path node 120 than advertising packet 112 took. Indeed, individual packets of configuration packets 152 may take different paths to originating node 114 in some embodiments.

Originating node 114 then forwards configuration packets 152 to new device 110 using a connectable advertisement initially. In order to transmit configuration packets 152, originating node 114 can send an advertisement (non-connectable) or connect and write to new device 110 since it sends the connectable advertisement initially. Connectable advertisements may allow another endpoint to connect to the sender and transfer further information in a secured, connected way. Through this approach, much information can be transferred, but the process may be relatively slow. Connectable advertisements that are followed by connected data transfer may only be used for initial configurations in some embodiments, and for software or configuration updates.

Figure 2:
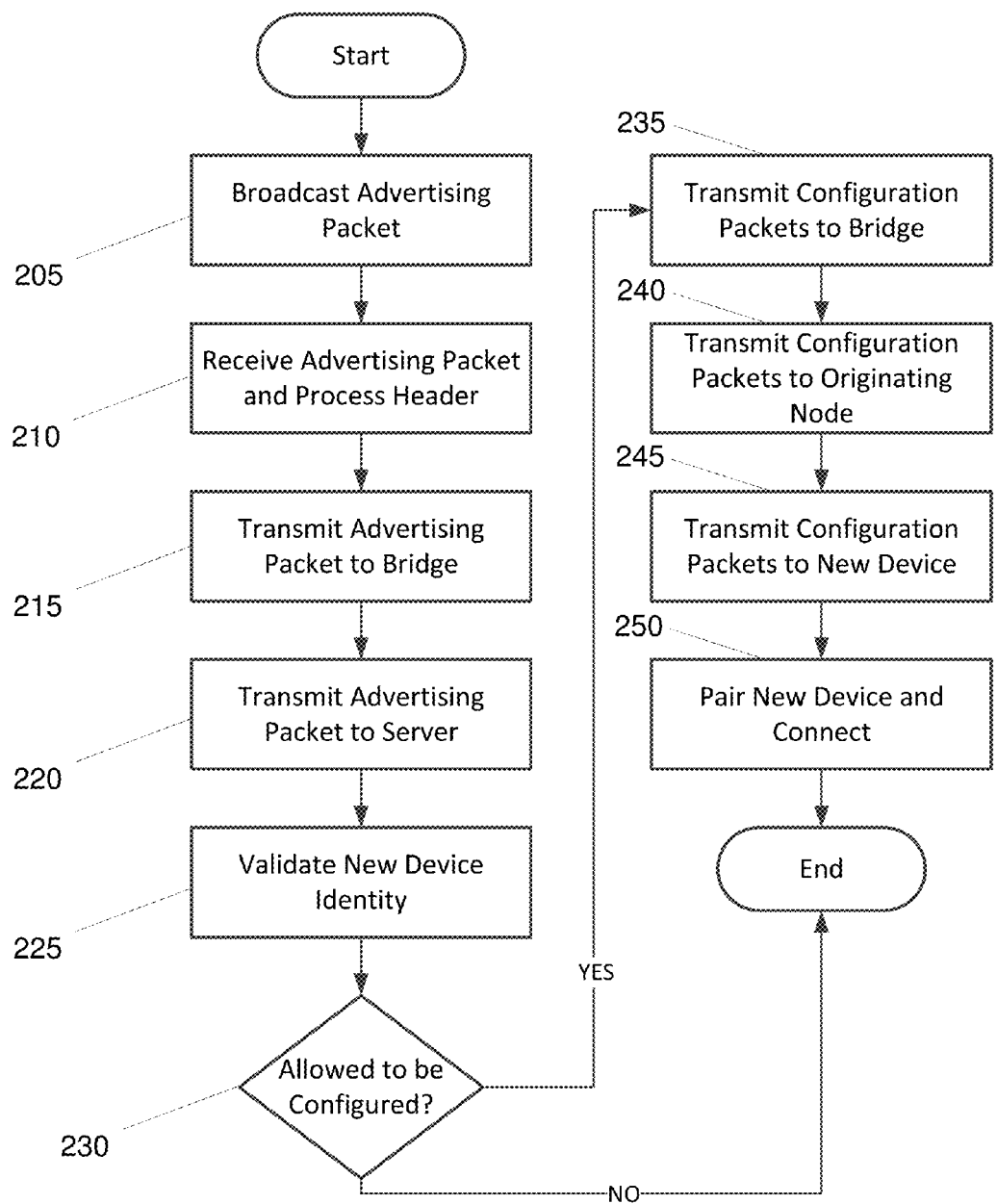
FIG. 2 is a flowchart illustrating a process for pairing a new device in a mesh network, according to an embodiment of the present invention.

FIG. 2 is a flowchart illustrating a process 200 for pairing a new device in a mesh network, according to an embodiment of the present invention. The process begins with a new device broadcasting an advertising packet at 205. The advertising packet may include an identifier of the new device for use by a server, which may be encrypted and only able to be decrypted by the server.

An originating node in the mesh network receives and processes the advertising packet header at 210. This may be any node in the mesh network in some embodiments. The header of the advertising packet contains information that informs the originating node to send the advertising packet along to the server. For instance, a status in the header may indicate that the new device is seeking a network connection and the IP address or other indicia pertaining to the server may also be provided. The originating node then broadcasts the advertising packet for receipt by its leader node by including that node's identifier in the packet header and the hop count, and this process is repeated until the advertising packet reaches a bridge at 215. More specifically, the packet is broadcast from one leader node to another until the packet reaches bridge 215.

The bridge is configured to communicate with the server, and transmits the advertising packet to the server at 220. Per the above, the server has the appropriate keys to decrypt the payload of the advertising packet. The server validates the identity of the new device using the decrypted information at 225. If the new device is allowed to be configured at 230, the server transmits configuration packets to the bridge at 235. Otherwise, the process ends. "Allowed to be configured" means that a user may be able to limit what device can be added to the system and when. Based on the rules configured in the server, the server may be able to allow all devices, a specific device (e.g., a device with a certain media access control (MAC) address), a specific type of device (e.g., a thermostat), a subset of devices (e.g., home electronics), or any combination thereof without deviating from the scope of the invention.

When the bridge receives the configuration packets from the server, it transmits this information back through the mesh network to the originating node at 240. The originating node then broadcasts the configuration packets with the identifier of the new device in the header at 245. The new device uses the configuration packets to complete pairing and configure itself to communicate with the mesh network at 250.

This pairing process may be repeated until all new devices that want to join are processed, and connected if this is permitted by the server. Once a new device joins the mesh network, it may look for a leader node. If it does not find one, it may start the leader node election process. Once the leader node has been established, the next new device may be processed. In this way, many devices may be paired and connected to the mesh network.

Figure 3:
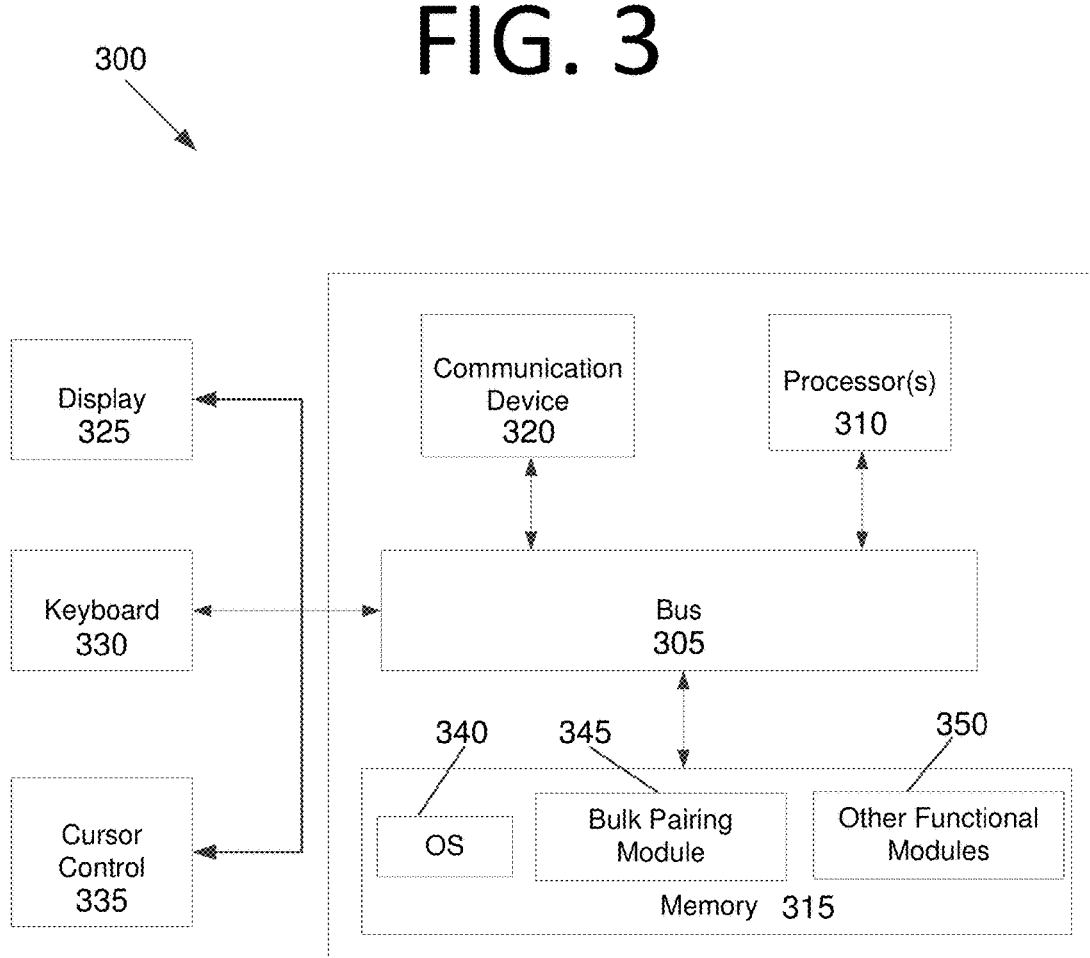
FIG. 3 is a block diagram illustrating a computing system configured to facilitate or participate in bulk pairing, according to an embodiment of the present invention.

FIG. 3 is a block diagram illustrating a computing system 300 configured to facilitate or participate in bulk pairing, according to an embodiment of the present invention. For instance, computing system may be a mesh network device, a device not yet connected to the mesh network, a bridge, a server, or any other suitable computing system without deviating from the scope of the invention. Computing system 300 includes a bus 305 or other communication mechanism for communicating information, and processor(s) 310 coupled to bus 305 for processing information. Processor(s) 310 may be any type of general or specific purpose processor, including a central processing unit (CPU) or application specific integrated circuit (ASIC). Processor(s) 310 may also have multiple processing cores, and at least some of the cores may be configured to perform specific functions. Multi-parallel processing may be used in some embodiments. Computing system 300 further includes a memory 315 for storing information and instructions to be executed by processor(s) 310. Memory 315 can be comprised of any combination of random access memory (RAM), read only memory (ROM), flash memory, cache, static storage such as a magnetic or optical disk, or any other types of non-transitory computer-readable media or combinations thereof. Additionally, computing system 300 includes a communication device 320, such as a transceiver and antenna, to wirelessly provide access to a communications network.

Non-transitory computer-readable media may be any available media that can be accessed by processor(s) 310 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 310 are further coupled via bus 305 to a display 325, such as a Liquid Crystal Display (LCD), for displaying information to a user. A keyboard 330 and a cursor control device 335, such as a computer mouse, are further coupled to bus 305 to enable a user to interface with computing system. However, in certain embodiments such as those for mobile computing implementations, a physical keyboard and mouse may not be present, and the user may interact with the device solely through display 325 via a haptic interface and/or a touchpad (not shown), or through no interface at all (e.g., where a device only has an "on" button). As such, display 325, keyboard 330, and/or cursor control device 335 may not be present in some computing systems. Any type and combination of input devices may be used as a matter of design choice.

Memory 315 stores software modules that provide functionality when executed by processor(s) 310. The modules include an operating system 340 for computing system 300. The modules further include a bulk pairing module 345 that is configured to perform any of the bulk pairing approaches discussed herein or derivatives thereof. Computing system 300 may include one or more additional functional modules 350 that include additional functionality.

One skilled in the art will appreciate that a "system" could be embodied as an embedded computing system, a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIG. 2 may be performed by a computer program, encoding instructions for the non-linear adaptive processor to perform at least the process described in FIG. 2, in accordance with embodiments of the present invention. The computer program may be embodied on a non-transitory computer-readable medium. The computer-readable medium may be, but is not limited to, a hard disk drive, a flash device, RAM, a tape, or any other such medium used to store data. The computer program may include encoded instructions for controlling the nonlinear adaptive processor to implement the processes described in FIG. 2, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A mesh network system, comprising:
a new device that has not yet joined the mesh network;
an originating node associated with the mesh network;
a leader node of the originating node, wherein the leader node is associated with the mesh network, and the leader node is designated as the leader node by an election by other nodes;
a bridge associated with the mesh network; and
a server, wherein
the new device is configured to broadcast an advertising packet comprising a header,
the originating node is configured to receive the advertising packet from the new device, process the header, determine from the header that the advertising packet is intended for the server, include an identifier of the leader node of the originating node in the header, increment the hop count in the header, and broadcast the advertising packet for receipt by the leader node of the originating node,
the leader node of the originating node is configured to receive the advertising packet from the originating node, increment the hop count in the header, and broadcast the advertising packet on condition that the hop count is less than a predetermined threshold,
the bridge is configured to receive the advertising packet from the leader node of the originating node and transmit the advertising packet to the server, and
the new device is allowed to be configured based on rules in the server, and the rules comprise the ability of the server to allow a specific device, a specific type of device, or a subset of devices.

2. The mesh network system of claim 1, wherein the advertising packet comprises an identifier of the new device for use by the server.

3. The mesh network system of claim 1, wherein a payload of the advertising packet is encrypted and can only be decrypted by the server.

4. The mesh network system of claim 1, further comprising:
another leader node associated with the network, wherein the other leader node is configured to receive the advertising packet from the leader node of the originating node, increment the hop count in the header, and broadcast the advertising packet for receipt by yet another leader node or the bridge.

5. The mesh network system of claim 1, wherein a payload of the advertising packet is encrypted, the server comprises keys to decrypt the payload of the advertising packet, and the server is configured to:
decrypt the payload;
validate an identity of the new device using the decrypted payload; and
when the new device is allowed to be configured, transmit configuration packets to the bridge.

6. The mesh network system of claim 5, wherein after the server transmits the configuration packets to the bridge, the configuration packets are transmitted back through the mesh network to the originating node, and the originating node then broadcast the configuration packets with an identifier of the new device in the header.

7. The mesh network system of claim 6, wherein the new device is configured to use the configuration packets complete pairing and configure itself to communicate with the mesh network.

8. The mesh network system of claim 5, wherein payloads of the configuration packets are encrypted such that they can only be decrypted by the new device.

9. The mesh network system of claim 1, wherein when a maximum hop count is reached, the mesh network system stops rebroadcasting the advertising packet.

10. A mesh network system, comprising:
a new device;
an originating node;
an endpoint node; and
a server, wherein
the new device is configured to transmit an advertising packet comprising a hop count and an encrypted payload that is received by the originating node and rebroadcast by one or more devices in the mesh network system until it is received by the endpoint node or a maximum hop count is reached,
the originating node configured to increment the hop count in the advertising packet,
the endpoint node is configured to transmit the advertising packet to the server, and
the server is configured to:
decrypt information in the encrypted payload of the advertising packet, identify the new device based on the decrypted information,
determine whether the new device is allowed to be configured,
when the new device is allowed to be configured, send encrypted configuration packets to the endpoint node, the encrypted configuration packets comprising network information that can only be decrypted by the new device, and
the new device is allowed to be configured based on rules in the server, and the rules comprise the ability of the server to allow a specific device, a specific type of device, or a subset of devices.

11. The mesh network system of claim 10, wherein the new device is configured to use the configuration packets complete pairing and configure itself to communicate with the mesh network.

12. The mesh network system of claim 10, wherein when a maximum hop count is reached, the mesh network system stops rebroadcasting the advertising packet.

13. A method for performing bulk pairing in a mesh network, comprising:
broadcasting an advertising packet comprising a header and an encrypted payload, by a new device that is not paired with the mesh network, the header comprising information that informs an originating node to increment a hop count in the header and send the advertising packet along to a leader node, wherein the mesh network includes the originating node, the leader node of the originating node, and a bridge, wherein the leader node is designated as a leader node by an election by other nodes; server;

receiving the advertising packet from the originating node to the leader node, wherein the leader node is configured to receive the advertising packet from the originating node, increment the hop count in the header and broadcast the advertising packet on condition that the hop count is less than a predetermined threshold;

receiving the advertising packet, packet from the leader node, processing the header to determine that the advertising packet is intended for the server, and transmitting the advertising packet to the server, by the bridge that is configured to communicate with the server;

decrypting the payload, validating an identity of the new device using the decrypted payload, and when the new device is allowed to be configured, transmitting configuration packets to the bridge, by the server, and the new device is allowed to be configured based on rules in the server, and the rules comprise the ability of the server to allow a specific device, a specific type of device, or a subset of devices.

14. The method of claim 13, further comprising:

receiving the configuration packets and broadcasting the configuration packets for receipt by the new device, by the bridge; and receiving the broadcast configuration packets and pairing with the mesh network, by the new device.

15. The method of claim 14, wherein payloads of the configuration packets are encrypted, and the method further comprises:

decrypting the payloads of the configuration packets and retrieving network connection information from the decrypted payloads, by the new device.

16. The method of claim 13, wherein the advertising packet comprises an identifier of the new device for use by the server.

* * * * *